US011529922B2

(12) United States Patent
Mihm et al.

(10) Patent No.: US 11,529,922 B2
(45) Date of Patent: Dec. 20, 2022

(54) AIRBAG HOUSING

(71) Applicant: Ford Global Technologies, LLC, Dearborn, MI (US)

(72) Inventors: Russell Joseph Mihm, Beverly Hills, MI (US); Michael Steven Medoro, Sunnyvale, CA (US); Andres Almeida Senatore, San Jose, CA (US); Dylan Mandelbaum, Mountain View, CA (US); Otis Allen, Soquel, CA (US); Siddharthan Selvasekar, Livermore, CA (US); Sydney Puckett, Detroit, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 17/242,677

(22) Filed: Apr. 28, 2021

(65) Prior Publication Data

US 2022/0348159 A1 Nov. 3, 2022

(51) Int. Cl.
*B60R 21/205* (2011.01)
*B60K 37/04* (2006.01)

(52) U.S. Cl.
CPC ............ *B60R 21/205* (2013.01); *B60K 37/04* (2013.01); *B60K 2370/152* (2019.05); *B60K 2370/67* (2019.05)

(58) Field of Classification Search
CPC B60R 21/205; B60K 37/04; B60K 2370/152; B60K 2370/67
See application file for complete search history.

(56) References Cited

U.S. PATENT DOCUMENTS

| 10,507,783 | B2 | 12/2019 | Rupp |
| 10,857,884 | B2 | 12/2020 | Derrick et al. |
| 11,155,230 | B2 * | 10/2021 | Rajagopalan .......... B60K 37/02 |
| 2020/0384861 | A1 * | 12/2020 | Kadam ................. B60R 21/205 |

FOREIGN PATENT DOCUMENTS

| DE | 102004040409 A1 * | 3/2006 | ........... B60R 21/205 |
| DE | 102013015534 A1 | 5/2014 | |
| JP | 6035183 B2 | 11/2016 | |

* cited by examiner

*Primary Examiner* — Drew J Brown
(74) *Attorney, Agent, or Firm* — Frank A. MacKenzie; Bejin Bieneman PLC (57) ABSTRACT

An assembly includes an airbag inflatable to an inflated position. The assembly includes an airbag housing supporting the airbag, the airbag housing having a side wall that is movable outward to a deployed position upon inflation of the airbag. The assembly includes a display screen moveable from an initial position to a stowed position, the display screen operatively coupled to the side wall such that movement of the side wall to the deployed position moves the display screen to the stowed position.

20 Claims, 13 Drawing Sheets

AIRBAG HOUSING

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly includes an airbag inflatable to an inflated position. The assembly includes an airbag housing supporting the airbag, the airbag housing having a side wall that is movable outward to a deployed position upon inflation of the airbag. The assembly includes a display screen moveable from an initial position to a stowed position, the display screen operatively coupled to the side wall such that movement of the side wall to the deployed position moves the display screen to the stowed position.

The assembly may include a rod operatively coupling the side wall to the display screen, the rod having a first portion and a second portion, the rod movable from an engaged position to a disengaged position, the first portion is connected to the second position in the engaged position, and the first portion disconnected from the second portion in the disengaged position.

The assembly may include a rod operatively coupling the side wall to the display screen, the rod having a first portion and a second portion, the first portion slidable within the second portion.

The assembly may include an instrument panel supporting the airbag housing and the display screen.

The assembly may include a track supported by the instrument panel, the display screen movable along the track from the initial position to the stowed position.

The display screen may be supported by the instrument panel at a hinge, the display screen rotatable about the hinge from the initial position to the stowed position.

The assembly may include a rod supported by the instrument panel at a pivot, the side wall may be operatively coupled to the rod at one side of the pivot, and the display screen operatively coupled to the rod at an opposite side of the pivot.

The assembly may include a second rod extending from the rod to the side wall at the one side of the pivot and a third rod extending from the rod to the display screen at the opposite side of the pivot.

The assembly may include a rod operatively coupling the display screen to the side wall, and the hinge may be below the rod.

The assembly may include a rod operatively coupling the display screen to the side wall, and the hinge may be above the rod.

The assembly may include a windshield, and the display screen may be between the airbag housing and the windshield along a longitudinal axis.

The assembly may include a rod operatively coupling the display screen to the side wall, the rod extending from the side wall toward the windshield.

The side wall may define a first slot and a second slot, the side wall may have a press plate between the first slot and the second slot, and the press plate may be movable outward to the deployed position.

The press plate of the side wall may be operatively coupled to the display screen such that movement of the press plate to the deployed position moves the display screen to the stowed position.

The airbag housing may include a bottom, the side wall may extend from the bottom to a top edge, and the first slot and the second slot may extend from the top edge toward the bottom.

The airbag housing may include a hinge, and the press plate may pivot about the hinge from the initial position to the deployed position.

With reference to the FIGS. 1-13, wherein like numerals indicate like parts throughout the several views, an assembly 20 for a vehicle 22 includes an airbag 24 inflatable to an inflated position. The assembly 20 includes an airbag housing 26 supporting the airbag 24, the airbag housing 26 having a side wall 28 that is movable outward to a deployed position upon inflation of the airbag 24. The assembly 20 includes a display screen 30 moveable from an initial position to a stowed position, the display screen 30 operatively coupled to the side wall 28 such that movement of the side wall 28 to the deployed position moves the display screen 30 to the stowed position. Moving the display screen 30 to the stowed position via moment of the side wall 28 reduces interface between the display screen 30 and the airbag 24 in the inflated position and/or between the display screen 30 and a pedestrian that may have been impacted by the vehicle 22.

The vehicle 22 may be any suitable type of automobile, e.g., a passenger or commercial automobile such as a sedan, a coupe, a truck, a sport utility vehicle, a crossover vehicle, a van, a minivan, a taxi, a bus, etc. The vehicle 22, for example, may be an autonomous vehicle. In other words, the vehicle 22 may be autonomously operated such that the vehicle 22 may be driven without constant attention from a driver, i.e., the vehicle 22 may be self-driving without human input.

In the present application, relative vehicular orientations and directions (by way of example, top, bottom, front, rear, outboard, inboard, inward, outward, lateral, left, right, forward, rearward, etc.) is from the perspective of the vehicle 22. The forward direction of the vehicle 22 is the direction of movement of the vehicle 22 when the vehicle 22 is engaged in forward drive with wheels of the vehicle 22 pointed straight. Orientations and directions relative to the sensor assembly 20 are given related to when the assembly is supported by the vehicle 22 as described below and shown in the Figures.

The vehicle 22 defines a longitudinal axis A1 extending between a front and a rear of the vehicle 22. The vehicle 22 defines a lateral axis A2 extending between a left side and a right side of the vehicle 22. The vehicle 22 defines a vertical axis A3 extending between a top and a bottom of the vehicle 22. The longitudinal axis A1, the lateral axis A2, and the vertical axis A3 are perpendicular relative to each other.

The vehicle 22 includes a passenger compartment 32. The passenger compartment 32 houses occupants, if any, of the vehicle 22. For example, seats of the occupants may be supported in passenger compartment 32. The passenger compartment 32 may extend across the vehicle 22, i.e., from the right side to the left side of the vehicle 22. The passenger compartment 32 includes a front end and a rear end with the front end being in front of the rear end during forward movement of the vehicle 22.

The vehicle 22 includes a windshield 34, e.g., disposed at the front end of the passenger cabin. The windshield 34 may extend from the left side the vehicle 22 to the right side of the vehicle 22, e.g., along the lateral axis A2. The windshield 34 may extend from an instrument panel 36 of the vehicle 22 to a roof of the vehicle 22, e.g., along the longitudinal axis A1 and the vertical axis A3. The windshield 34 may be any suitably transparent material, including glass such as laminated, tempered glass or plastic.

The instrument panel 36 may be supported at the front end of the passenger compartment 32. The instrument panel 36 may extend from a pillar on the right side of the vehicle 22 to a pillar on the left side of the vehicle 22. In other words, the instrument panel 36 may extend completely across the passenger compartment 32 along the lateral axis A2. The instrument panel 36 includes one or more instruments such as gauges, displays, a user interface, etc. The instrument panel 36 presents information to and may receive information from an occupant of the vehicle 22. The instrument panel 36 may include dials, digital readouts, speakers, buttons, knobs, keypads, microphone, and so on for providing information to, and receiving information from, the occupant. The instrument panel 36 may support the display screen 30, the airbag housing 26, and/or vehicle controls, including a steering wheel.

The display screen 30 is a human-machine interface ("HMI") that visually displays messages and images to the occupants in the passenger compartment 32. For example, the display screen 30 may be an LCD display, and LED display, a plasma display, etc. The display screen 30 may receive messages from the occupants, e.g., the display screen 30 may be touch sensitive. The display screen 30 is movable from the initial position to the stowed position, e.g., via translation and/or rotation. The display screen 30 may be forward of the airbag housing 26, e.g., the display screen 30 may be between the airbag housing 26 and the windshield 34 along the longitudinal axis A1 as shown in FIGS. 2 and 5-11. The display screen 30 may be rearward of the airbag housing 26, e.g., the airbag housing 26 may be between the display screen 30 and the windshield 34 along the longitudinal axis A1 as shown in FIGS. 12 and 13

The display screen 30 in the initial position, shown in FIGS. 1, 2, 6, 8, 10, and 12 faces occupants of the passenger compartment 32, e.g., such that the occupants can see messages and other visual information presented by the display screen 30. The display screen 30 in the stowed position, shown in FIGS. 5, 7, 9, 11, and 13 may enable inflation of the airbag 24, e.g., the display screen 30 in the stowed position may be free from impinging on the airbag 24 in the inflated position, outside of a path of inflation for the airbag 24, etc. The display screen 30 in the stowed position may be free from interfering with other components of the vehicle 22, e.g., during an impact to the vehicle 22, and/or a pedestrian impacted by the vehicle 22.

Figure 1:
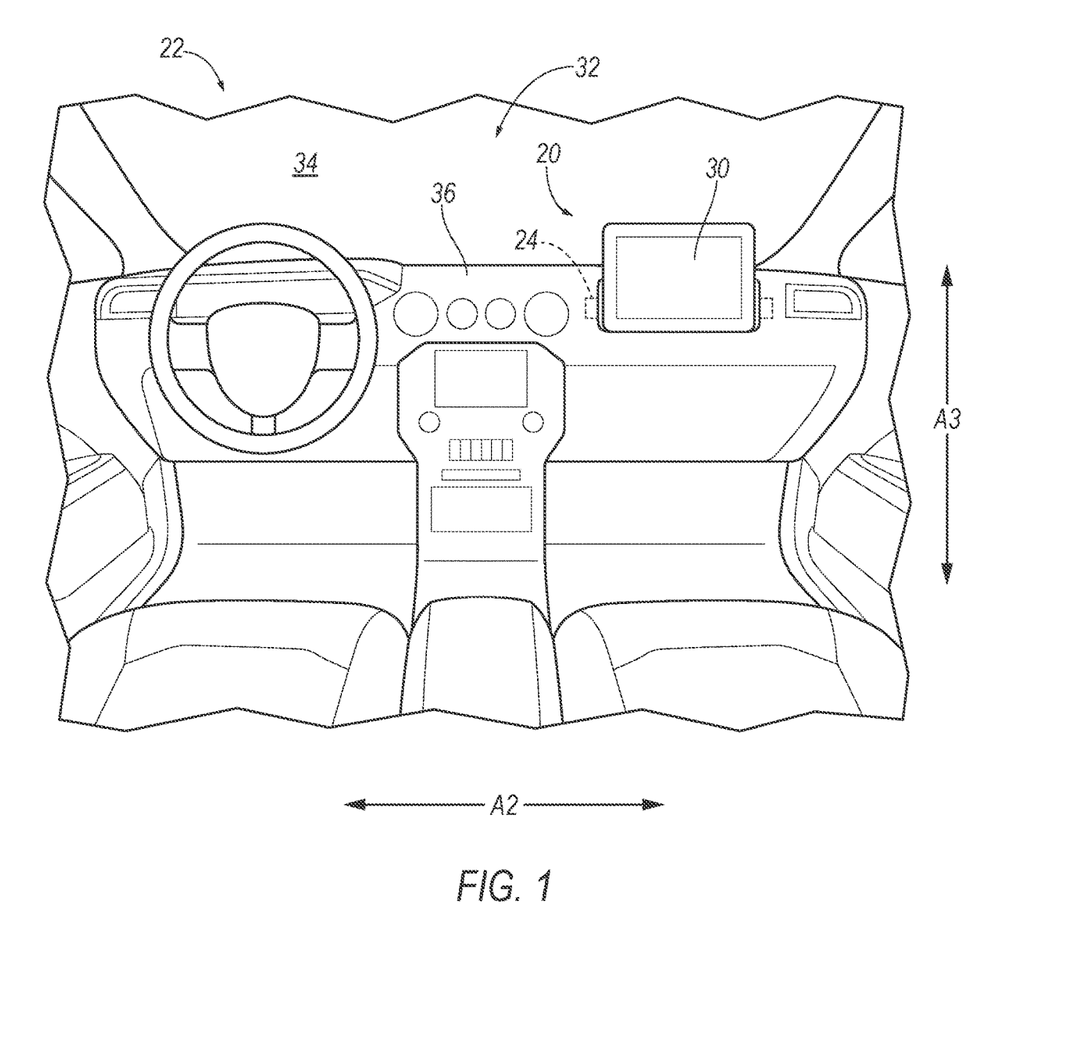
FIG. 1 is a perspective view of a vehicle passenger compartment with an instrument panel supporting an airbag housing.
Figure 2:
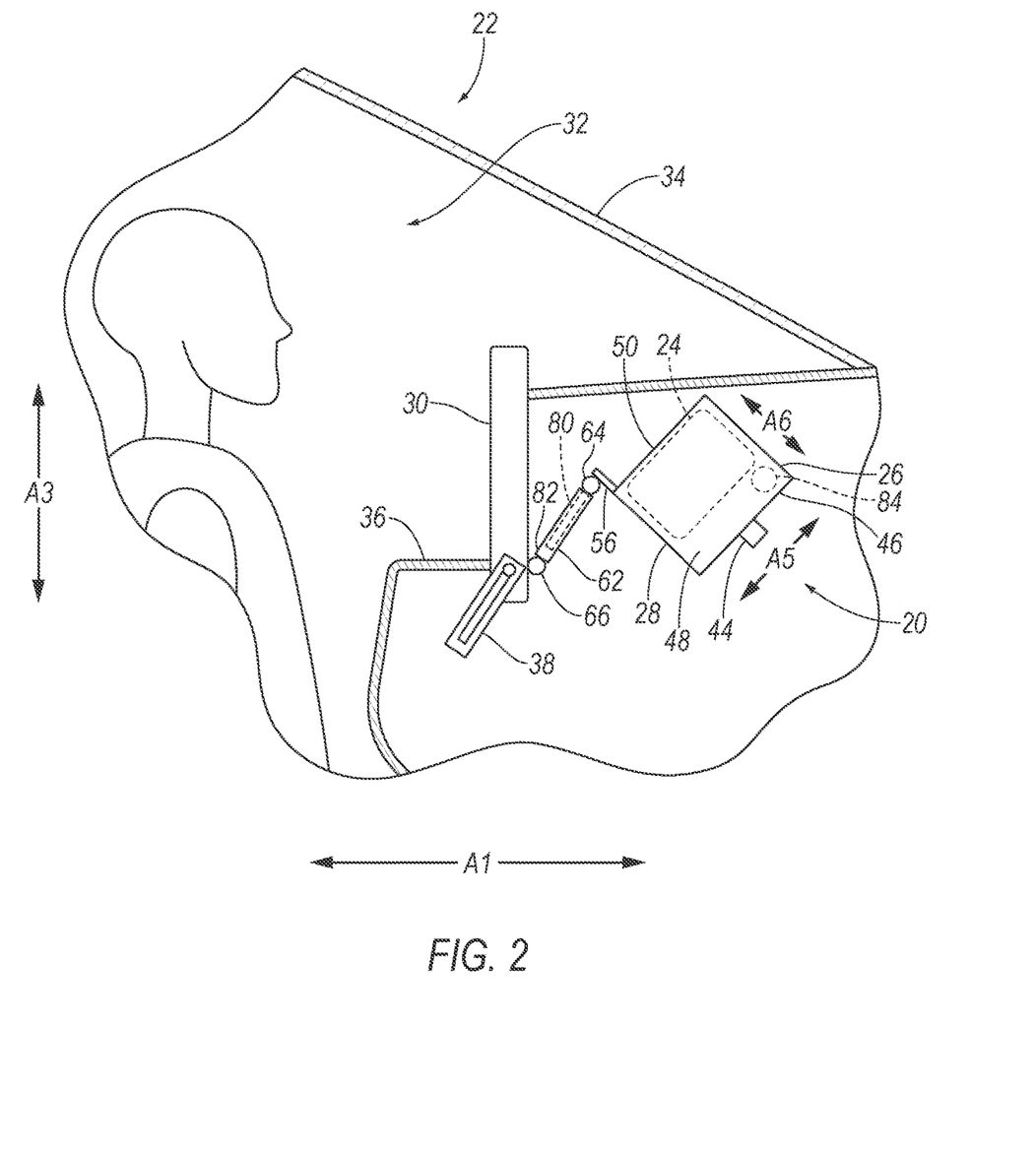
FIG. 2 is a cross section of the instrument panel supporting the airbag housing.
Figure 5:
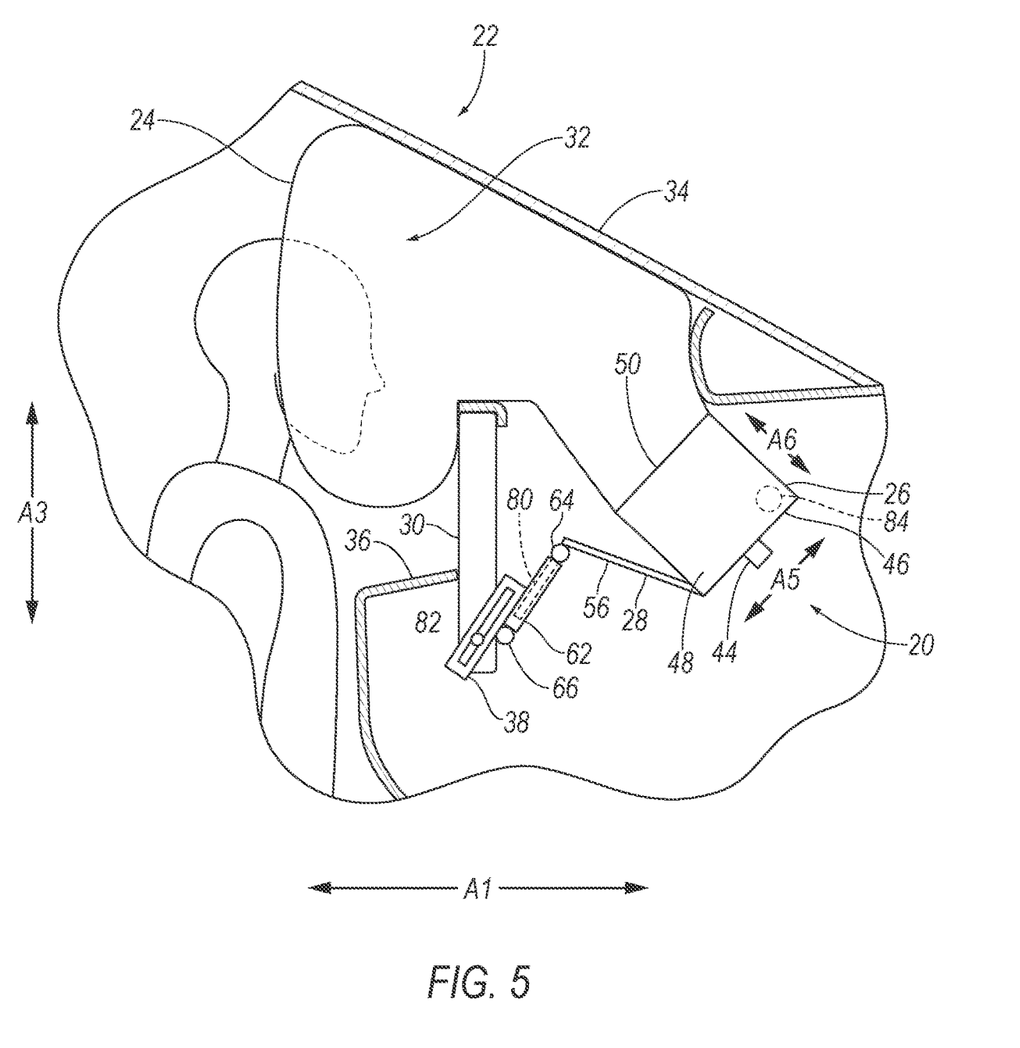
FIG. 5 is a cross section of the instrument panel supporting the airbag housing and having an airbag in an inflated position.

With reference to FIGS. 2 and 5, a track 38 may be supported by the instrument panel 36. The track 38 may include channels, grooves, slots 60, or other structure that control movement along the track 38. The channels, grooves, slots 60, etc., may be elongated between ends of the track 38. The display screen 30 may be movable along the track 38, e.g., from the initial position to the stowed position. For example, a pin or other suitable structure may connect the display screen 30 to the channels, grooves, slots 60, etc. Normal forces between the pin and the track 38 may permit movement of the display screen 30 along the elongation of the to the channels, grooves, slots 60, etc., and inhibit movement of the display screen 30 transverse to the channels, grooves, slots 60, etc.

Figure 8:
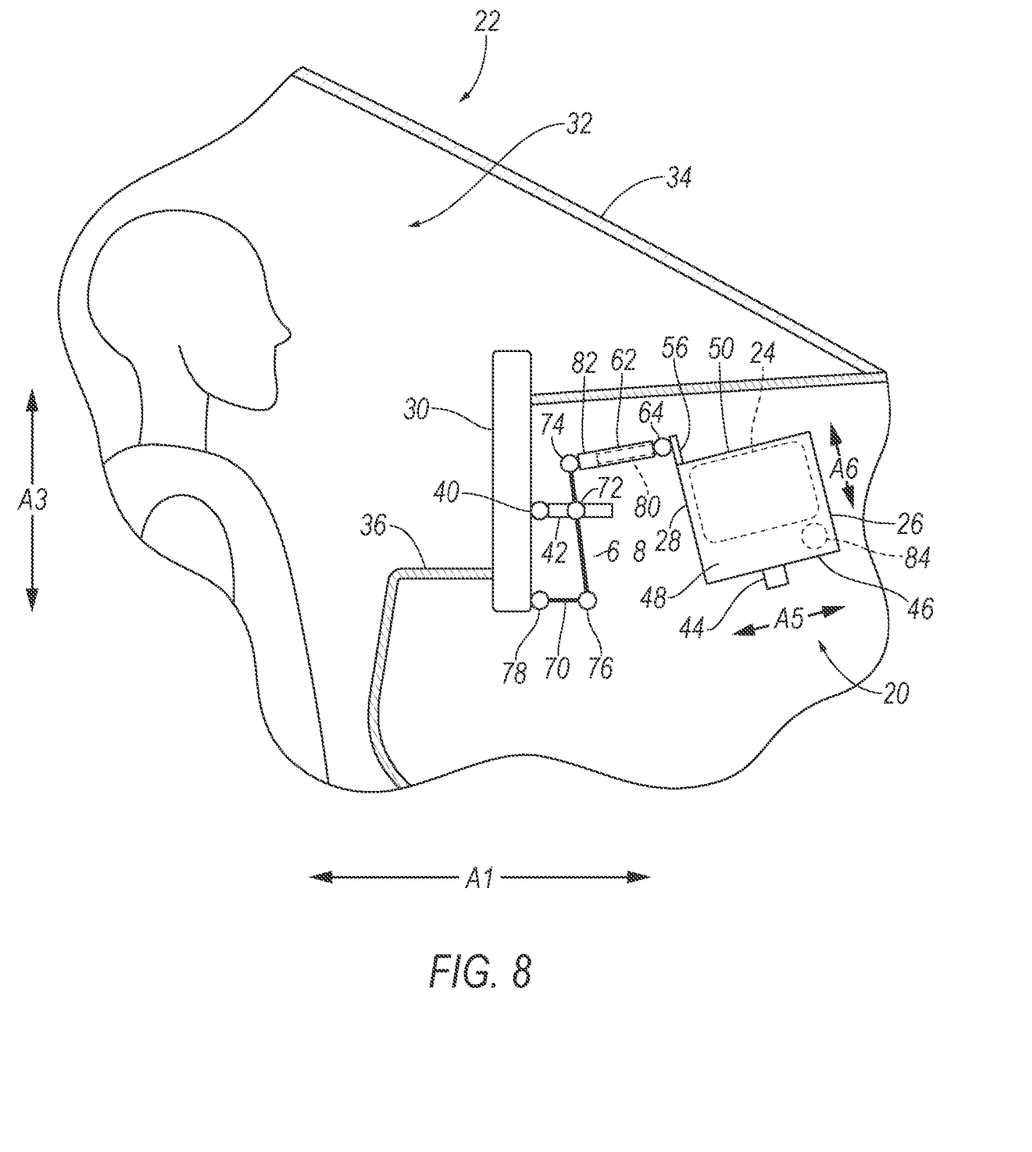
FIG. 8 is a cross section of the instrument panel supporting the airbag housing.
Figure 9:
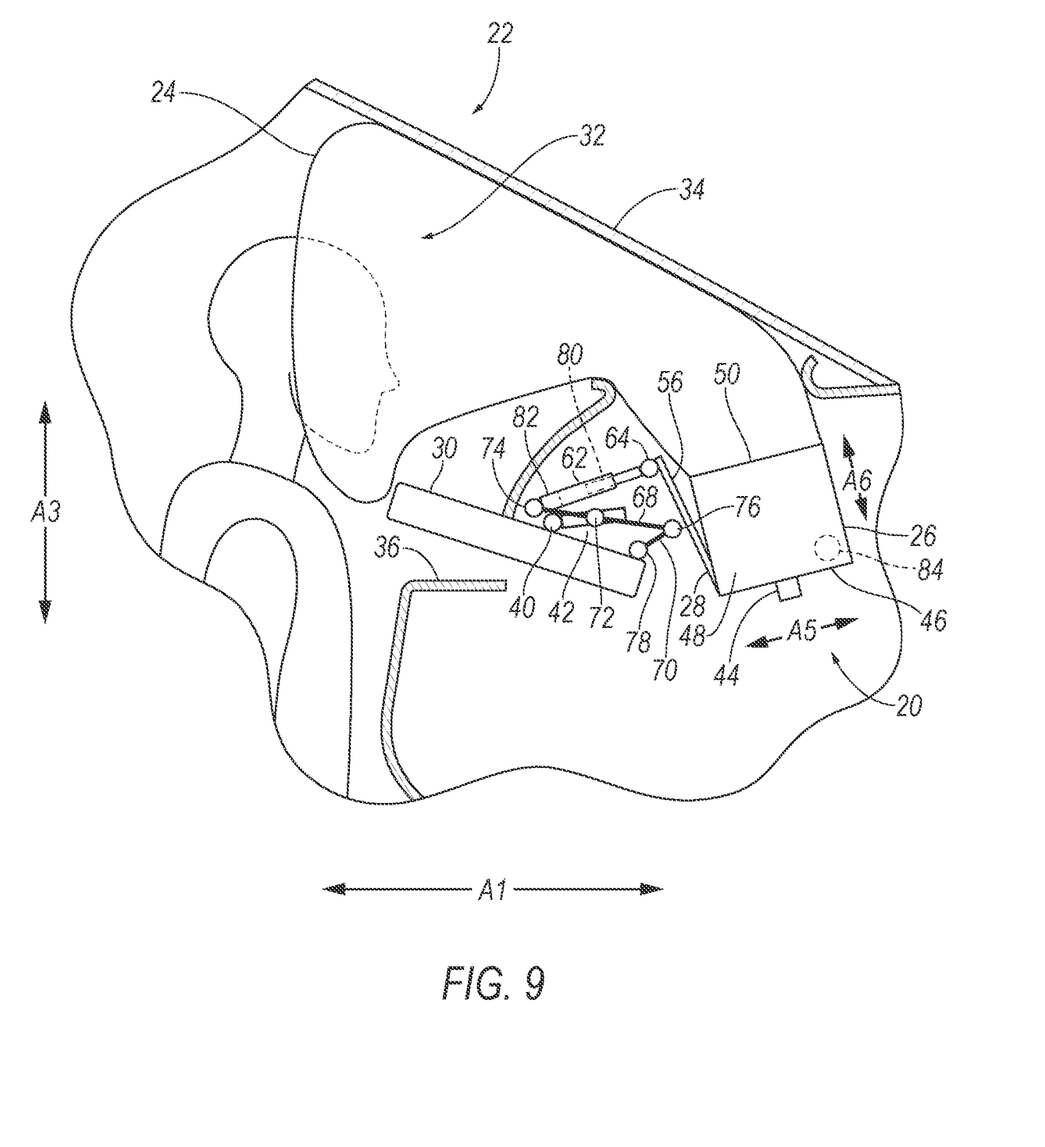
FIG. 9 is a cross section of the instrument panel supporting the airbag housing and having the airbag in the inflated position.
Figure 10:
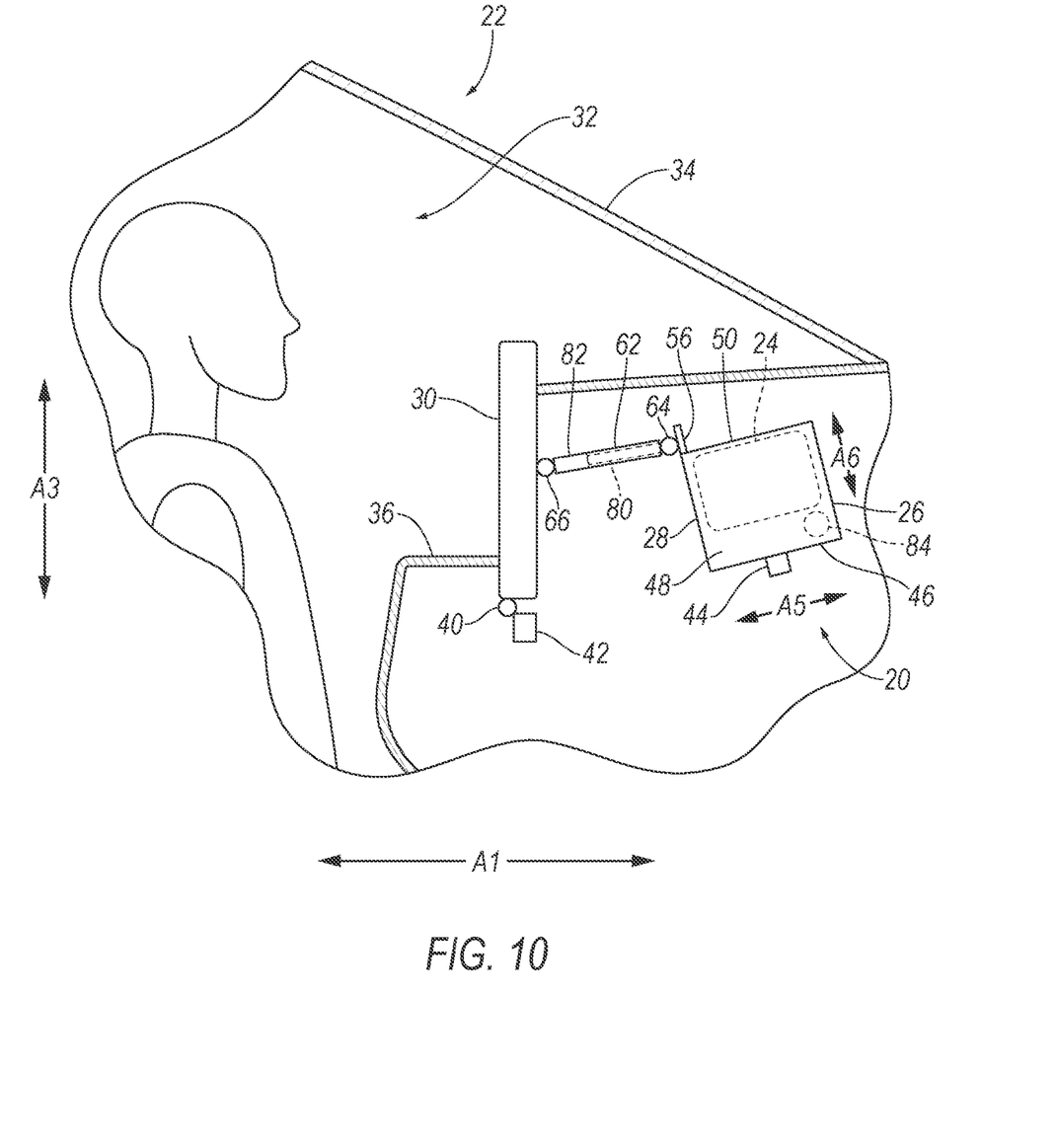
FIG. 10 is a cross section of the instrument panel supporting the airbag housing.
Figure 11:
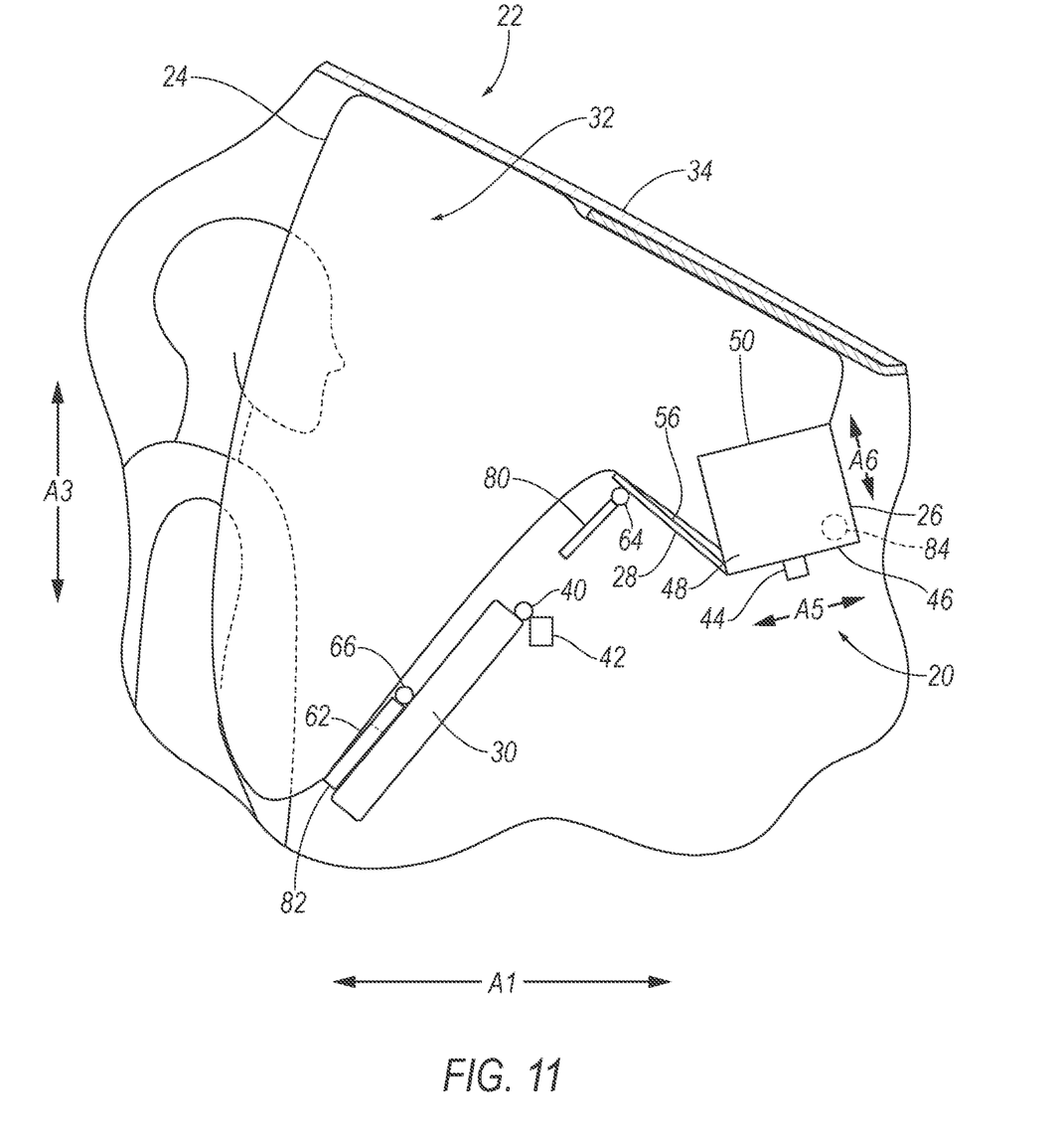
FIG. 11 is a cross section of the instrument panel supporting the airbag housing and having the airbag in the inflated position.
Figure 12:
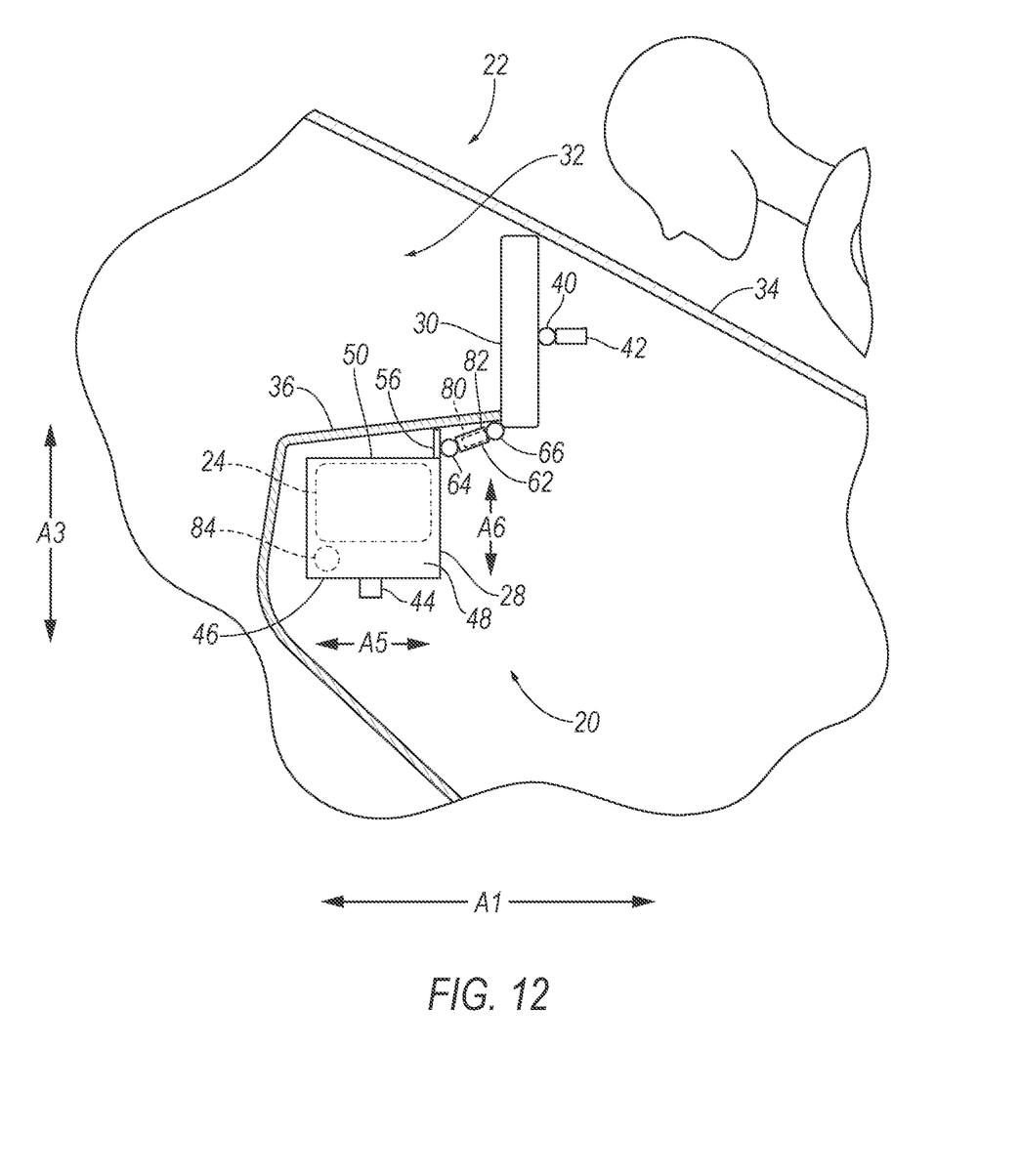
FIG. 12 is a cross section of the instrument panel supporting the airbag housing.
Figure 13:
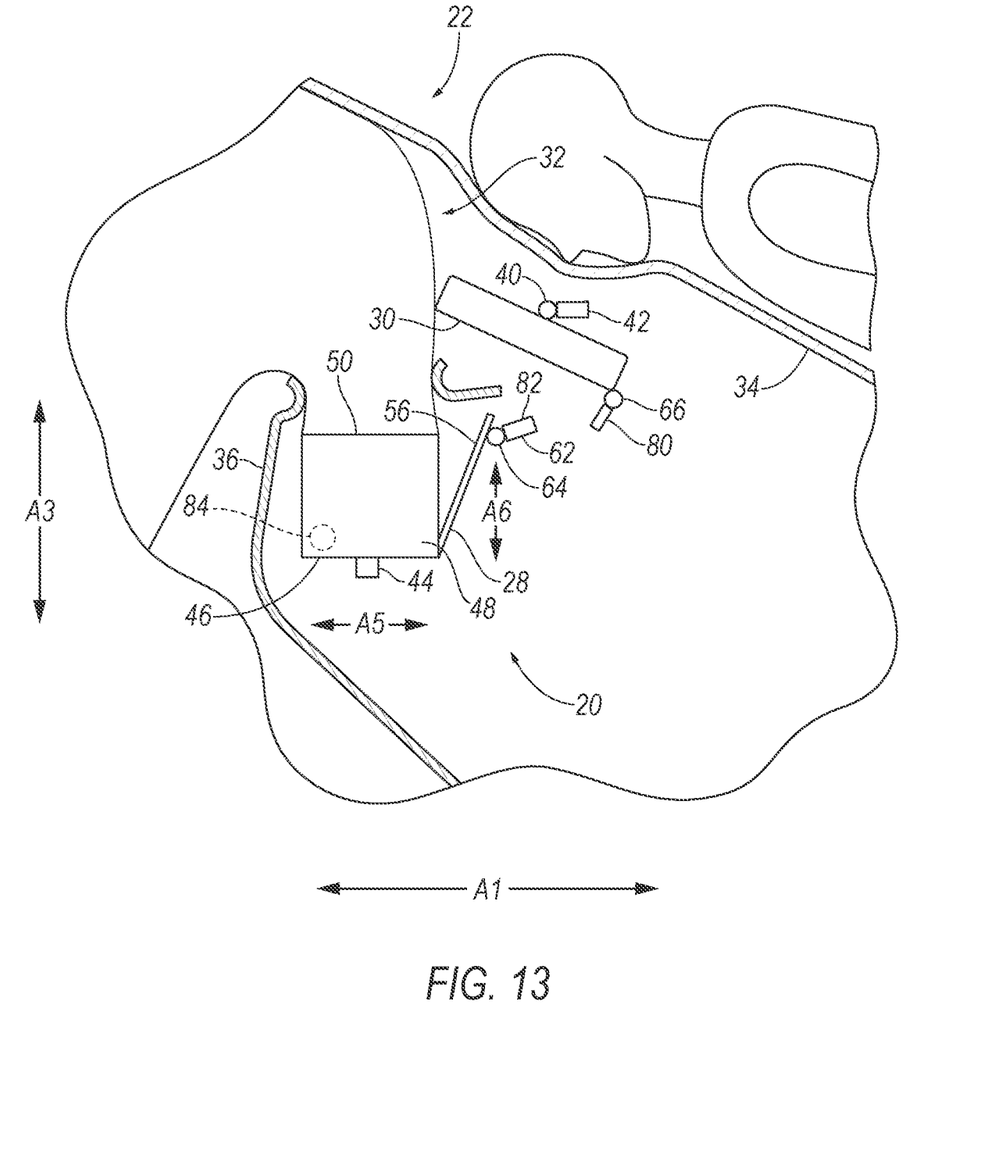
FIG. 13 is a cross section of the instrument panel supporting the airbag housing and having the airbag in the inflated position.

With reference to FIGS. 6-13, the display screen 30 may be supported by the instrument panel 36, or other vehicle structure, at a first hinge 40. The display screen 30 may be rotatable about the first hinge 40, e.g., from the initial position to the stowed position. The first hinge 40 may be connected to the display screen 30 and the instrument panel 36 and include a pivot therebetween. The first hinge 40 may be a living hinge, a barrel hinge, a continuous hinge or other suitable structure for proving relative rotation between to structures. The first hinge 40 may be connected to the display screen 30 with a fastener or the like. The first hinge 40 may be connected to the display screen 30 midway between a top and a bottom of the display screen 30, e.g., as shown in FIGS. 6-9, 12, and 13. The first hinge 40 may be connected to the display screen 30 at the bottom of the display screen 30, e.g., as shown in FIGS. 10 and 11. The first hinge 40 may be connected to a bracket 42, or other suitable rigid structure of the instrument. The first hinge 40 may be connected to the display screen 30 at the top of the display screen 30, i.e., closer to the top than the bottom (not shown).

As shown in FIGS. 2-13, the airbag housing 26 supports the airbag 24. The airbag housing 26 packages the airbag 24 in the uninflated position. The airbag housing 26 may provide a reaction surface for the airbag 24 in the inflated position. The airbag housing 26 may be formed of any material, e.g., a rigid polymer, a metal, a composite, etc. The airbag housing 26 may be fixed to any suitable structure of the vehicle 22, such as the instrument panel 36, steering wheel, pillar, seat, roof, floor, etc. For example, the airbag housing 26 may be fixed to a crossbar 44, or other suitable structure, of to the instrument panel 36 with a fastener or the like.

The airbag housing 26 may include a base 46. The base 46 may extend along a housing longitudinal axis A4 and a housing lateral axis A5 perpendicular to the housing longitudinal axis A4. The housing longitudinal axis A4 may be parallel to the lateral axis A2 of the vehicle 22. The base 46 may be elongated along the housing longitudinal axis A4. In other words, a length of the base 46 along the housing longitudinal axis A4 may be greater than a length of the base 46 along the housing lateral axis A5.

The airbag housing 26 includes one or more side walls 28 and may include one or more end walls 48. The side walls 28 may each extend away from the base 46 e.g., along a housing vertical axis A6 that is perpendicular to the housing longitudinal axis A4 and the housing lateral axis A5. The side walls 28 may extend from the base 46 to a top edge 50 of the airbag housing 26. The side walls 28 may extend along the housing longitudinal axis A4. The side walls 28 may extend from one end wall 48 to another end wall 48. The side walls 28 may be spaced from each other along the housing lateral axis A5. The end walls 48 each away extend from the base 46, e.g., along the housing vertical axis A6. The end walls 48 may each extend from the base 46 to the top edge 50 of the airbag housing 26. The end walls 48 may extend along the housing lateral axis A5, e.g., from one of the side walls 28 to the other of the side walls 28. The end walls 48 are spaced from each other, e.g., along the housing longitudinal axis A4.

The base 46, the side walls 28, and the end walls 48 may be unitary, i.e., a single, uniform piece of material with no seams, joints, fasteners, or adhesives holding it together. Specifically, the base 46, the side walls 28, and the end walls 48 may be formed together simultaneously as a single continuous unit, e.g., by machining from a unitary blank, molding, forging, casting, stamping, etc. Non-unitary components, in contrast, are formed separately and subsequently assembled, e.g., by threaded engagement, welding, etc.

The base 46, the side walls 28, and the end walls 48 define a cavity 52. For example, the cavity 52 may be between the side walls 28 along the lateral axis A2, and between the end walls 48 along the housing longitudinal axis A4. The base 46 may define a bottom of the cavity 52. The cavity 52 may include an open top 54, e.g., at the top edge 50. In other words, the top edge 50 may surround the open top 54, e.g., along the housing longitudinal axis A4 and the housing lateral axis A5. The open top 54 may be opposite the base 46 relative to the cavity 52 along the housing vertical axis A6.

Figure 3:
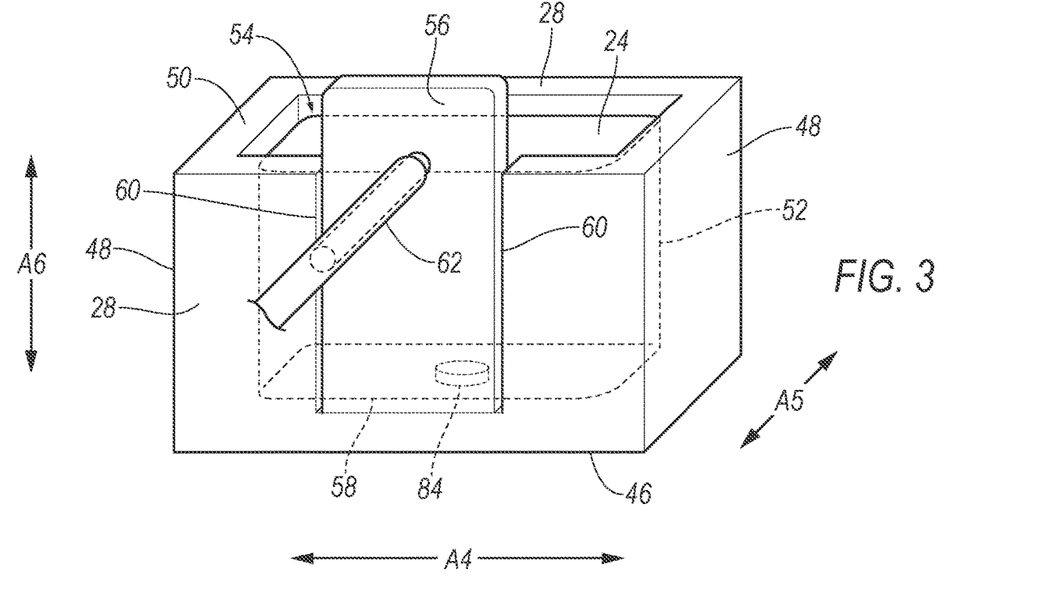
FIG. 3 is a perspective view of the airbag housing with a side wall in an initial position.
Figure 4:
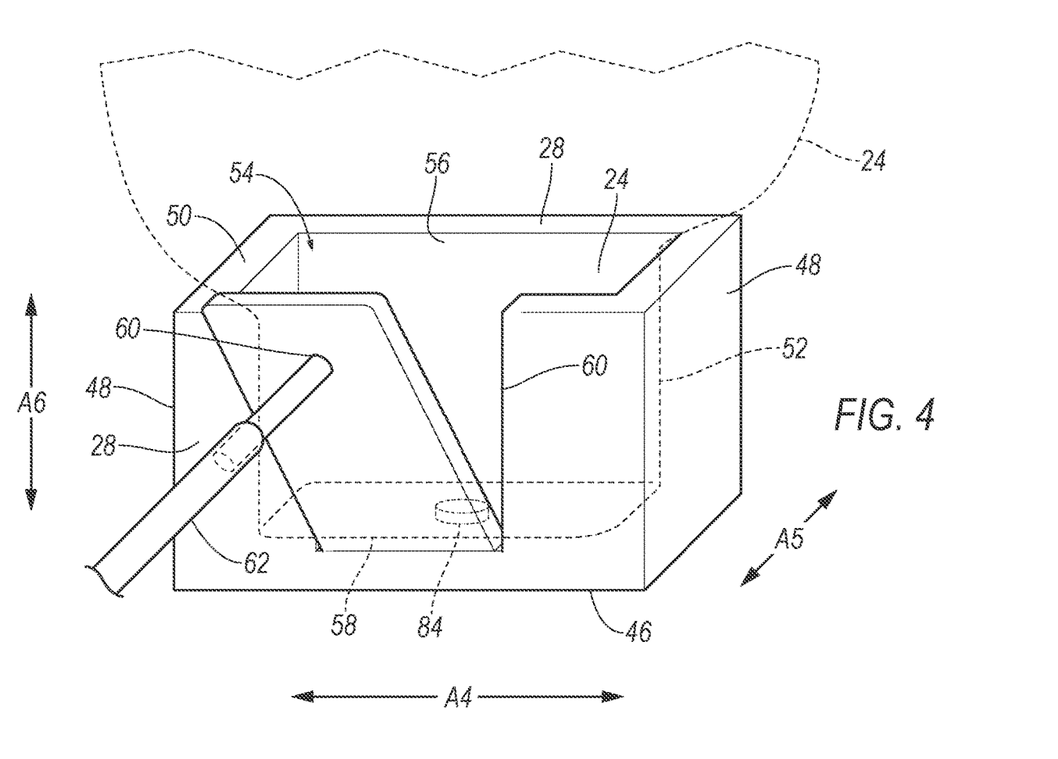
FIG. 4 is a perspective view of the airbag housing with the side wall in a deployed position.

The side walls 28 may each include one or more press plates 56. The press plate 56 is movable from the initial position, e.g., as shown in FIG. 3, outward away from the cavity 52 to the deployed position, e.g., as shown in FIG. 4. For example, the airbag housing 26 may include a second hinge 58. The press plate 56 may pivot about the second hinge 58 outward, i.e., away from the cavity 52, from the initial position to the deployed position. The description of the press plate 56 herein is an example of a side wall 28 movable from the initial position to the deployed position. The side wall 28 may be movable from the initial position outward away from the cavity 52 to the deployed position with the press plate 56, e.g., a side wall without the press plate may flex and otherwise outwardly deflect to move from the initial position to the deployed position.

Slots 60 defined by the side wall 28 are located on opposing sides of the press plate 56. In other words, the press plate 56 may be between first and second slots 60. The slots 60 may be open at the top edge 50. The slots 60 may each extend from the top edge 50 toward the base 46, e.g., along the housing vertical axis A6 to distal ends. The second hinge 58 may extend from the distal end of one of the slots 60 to the distal end of another of the slots 60.

The display screen 30 is operatively coupled to the side wall 28 of the airbag housing 26, e.g., to the press plate 56, such that movement of the side wall 28 to the deployed position moves the display screen 30 to the stowed position. In other words, the display screen 30 is mechanically connected to the side wall 28 such that force provided by movement of the side wall 28 from the initial position is transmitted to the display screen 30 and urges the display screen 30 to the stowed position. The display screen 30 may be operatively coupled to the press plate 56 via one or more rods 62, 68, 70, hinges 64, 66, 74, 76 78, and/or other suitable structures.

The rods 62, 68, 70 may be elongated between a pair of opposing ends. One end of a first rod 62 may be connected to the side wall 28, e.g., to the press plate 56. For example, a third hinge 64 or other suitable structure may connect the first rod 62 to the press plate 56. The third hinge 64 permits relative rotation between the press plate 56 and the first rod 62. The opposite end of the first rod 62 may be connected to the display screen 30, to another rod 68, 70, or to other suitable structure that may transmit force from the first rod 62 to the display screen 30.

With reference to FIGS. 2, 5-7, and 10-12 the opposite end of the first rod 62 may be connected to the display screen 30 with a fourth hinge 66. The fourth hinge 66 may be spaced from the first hinge 40. The first hinge 40 may be above the first rod 62, e.g., above the fourth hinge 66, as shown in FIGS. 6, 7, 12 and 13. The first hinge 40 may be below the first rod 62, e.g., below the fourth hinge 66, as shown in FIGS. 10 and 11. The first rod 62 may extend from the side wall 28 away from the windshield 34, e.g., rearward toward an occupant facing the instrument panel 36 and as shown in FIGS. 2 and 5-11. The first rod 62 may extend from the side wall 28 toward the windshield 34, e.g., forward from the side wall 28 and as shown in FIGS. 12 and 13.

With reference to FIGS. 8 and 9, the opposite end of the first rod 62 may be connected to the display screen 30, e.g., via a second rod 68 and a third rod 70. The second rod 68 may be supported by the instrument panel 36 at a pivot 72 that enables rotation of the second rod 68 relative to the instrument panel 36. For example, the pivot 72 may include an axle pin attaching the second rod 68 to the bracket 42 supporting the display screen 30, or other suitable structure. The second rod 68 may rotate about the axle pin.

The side wall 28 may be operatively coupled to the second rod 68 at one side of the pivot 72, i.e., such that force from movement of the side wall 28 is applied to the second rod 68 at a distance from the pivot 72. In other words, the side wall 28 may be connected to the second rod 68 such that force from the side wall 28 applies torque to the second rod 68 about the pivot 72. For example, the first rod 62 may extend from the side wall 28 and attach to a first end of the second rod 68 at one side of the pivot 72, e.g., at a fifth hinge 74. The fifth hinge 74 may permit relative rotation between the first rod 62 and the second rod 68. The display screen 30 may be operatively coupled to the second rod 68 at an opposite side of the pivot 72, i.e., such that force from movement of the second rod 68 is transmitted to the display screen 30 and can move the display screen 30 to the stowed position. For example, the third rod 70 may extend from the second rod 68 to the display screen 30 at the opposite side of the pivot 72, e.g., at a sixth hinge 76. The sixth hinge 76 may permit relative rotation between the second rod 68 and the third rod 70. The pivot 72 may be between the fifth hinge 74 and the sixth hinge 76 along the second rod 68. The third rod 70 may be connected to the display screen 30, e.g., with a seventh hinge 78 opposite the sixth hinge 76. The seventh hinge 78 may permit relative rotation between the third rod 70 and the display screen 30.

The first rod 62 may be moveable from an engaged position, e.g., as shown in FIG. 10, to a disengaged position, e.g., shown in FIG. 11. The first rod 62 in the engaged position transmits movement and/or force from the side wall 28 to the display screen 30. The first rod 62 in the disengaged position does not transmit movement and/or force from the side wall 28 to the display screen 30. For example, the first rod 62 may include includes a first portion 80 and a second portion 82. The first portion 80 may be connected to the second portion 82 in the engaged position and disconnected from the second portion 82 in the disengaged position. For example, the first portion 80 may be a shaft slidable within a hollow cylindrical body of the second portion 82, e.g., in a telescoping arrangement. The first portion 64 and the second portion 66 (including the shaft and hollow body) may be other shapes, e.g., rectangular in cross section. When the first rod 62 is subject to compression, e.g., when the press plate 56 moves from the initial position to the deployed position, the first portion 80 may be urged toward the second portion 82 and may maintain engagement, e.g., the first portion 80 may maintain disposition within the second portion 82 and transfer force from the press plate 56 to the display screen 30. When the first rod 62 is subject to tension, e.g., when the press plate 56 moves from the deployed position back toward the initial position, the first portion 80 may slide away from and out of connection with the second portion 82, not transferring force from the press plate 56 to the display screen 30. For example, the first portion 80 may slide away from the second portion 82 to the disengaged position, e.g., with the first portion 80 separated from the second portion 82.

The airbag 24 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 24 is supported by the airbag housing 26. The airbag 24 is inflatable from the uninflated position, shown in FIGS. 1, 2, 6, 8, 10, and 12, to the inflated position, shown in FIGS. 5, 7, 9, 11, and 13. The airbag 24 in the uninflated position is disposed in the cavity 52. For example, the airbag 24 in the uninflated position may be between the side walls 28 along the housing lateral axis A5, between the end walls 48 along the housing longitudinal axis A4, and between the base 46 and the open top 54 along the housing vertical axis A6. The airbag 24 in the inflated position extends out of the cavity 52 through the open top 54. In other words, the airbag 24 in the inflated position is outside the cavity 52, e.g., with the open top 54 between the airbag 24 and the airbag housing 26.

An inflator 84 may be in fluid communication with the airbag 24. The inflator 84 expands the airbag 24 with inflation medium, such as a gas, to move the airbag 24 from the uninflated position to the inflated position. The inflator 84 be supported by any suitable component. For example, the inflator 84 may be supported by the airbag housing 26 in the cavity 52. The inflator 84 may be aligned with the press plate 56, e.g., at a common position along the housing longitudinal axis A4. The inflator 84 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 84 may be, for example, at least partially in an inflation chamber of the airbag 24 to deliver inflation medium directly to the inflation chamber or may be connected to the inflation chamber through fill tubes, diffusers, etc. The inflator 84 may inflate the airbag 24 in response to receiving a command from a computer 88, e.g., transmitted upon an impact to the vehicle 22 and detected with an impact sensor 86.

Figure 14:
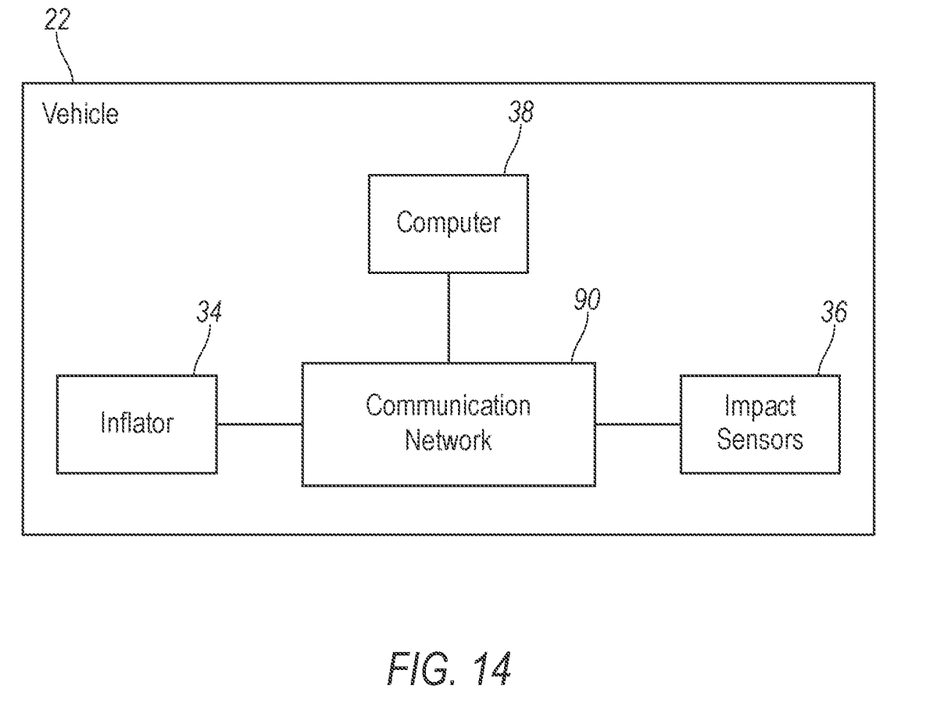
FIG. 14 is a block diagram of components of the vehicle.

With reference to FIG. 14, the vehicle 22 may include one or more impact sensors 86 configured to detect an impact to the vehicle 22. The impact sensors 86 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors 86 may be located at numerous points in or on the vehicle 22.

The computer 88 is a microprocessor-based controller implemented via circuits, chips, or other electronic components. The computer 88 includes a processor and a memory such as are known. The memory includes one or more forms of computer 88 readable media, and stores instructions executable by the computer 88 for performing various operations, including as disclosed herein. The computer 88 may be programmed to execute operations disclosed herein. Specifically, the memory stores instructions executable by the processor to execute the operations disclosed herein and electronically stores data and/or databases. For example, the computer 88 may include one or more dedicated electronic circuit including an ASIC (Application Specific Integrated Circuit) that is manufactured for a particular operation. In another example, the computer 88 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer 88 may be a set of computers communicating with one another.

The computer 88 is generally arranged for communications on a communication network 90 that can include a bus in the vehicle 22 such as a controller area network (CAN) or the like, and/or other wired and/or wireless mechanisms. Via the communication network 90, the computer 88 may transmit messages to various devices in the vehicle 22, and/or receive messages (e.g., CAN messages) from the various devices, e.g., the inflator 84, the impact sensors 86, etc. Alternatively or additionally, in cases where the computer 88 comprises a plurality of devices, the communication network 90 may be used for communications between devices represented as the computer 88 in this disclosure.

The computer 88 may be programmed to inflate the airbag 24. For example, under normal operating conditions of the vehicle 22, the airbag 24 is in the uninflated position. In the event of an impact, the impact sensor 86 may detect the impact and transmit a signal through the communication network 90 to the computer 88. In response to receiving such signal, the computer 88 may transmit a signal through the communication network 90 to the inflator 84 to inflate the airbag 24. In response to receiving such signal, the inflator 84 may discharge and inflate the airbag 24 to the inflated position to control kinematics the occupant.

Inflation of the airbag 24 from the uninflated position to the inflated position moves the side wall 28, e.g., the press plate 56, from the initial position to the deployed position. For example, force provided by the inflator 84 filling the inflation chamber with inflation medium may urge the press plate 56 outward and away from the cavity 52. Movement of the side wall 28, e.g., the press plate 56, from the initial position to the deployed position moves the display screen 30 to the stowed position.

With reference to FIGS. 2 and 5, movement of the press plate 56 to from the initial position to the deployed position may apply force to the first rod 62 and move the display screen 30 along the track 38 from the initial position shown in FIG. 2, to the stowed position in shown in FIG. 5. After moving to the deployed position, the press plate 56 may rebound, and urge the first portion 80 of the first rod 62 out of engagement with the second portion 82 of the first rod 62 (not shown).

Figure 6:
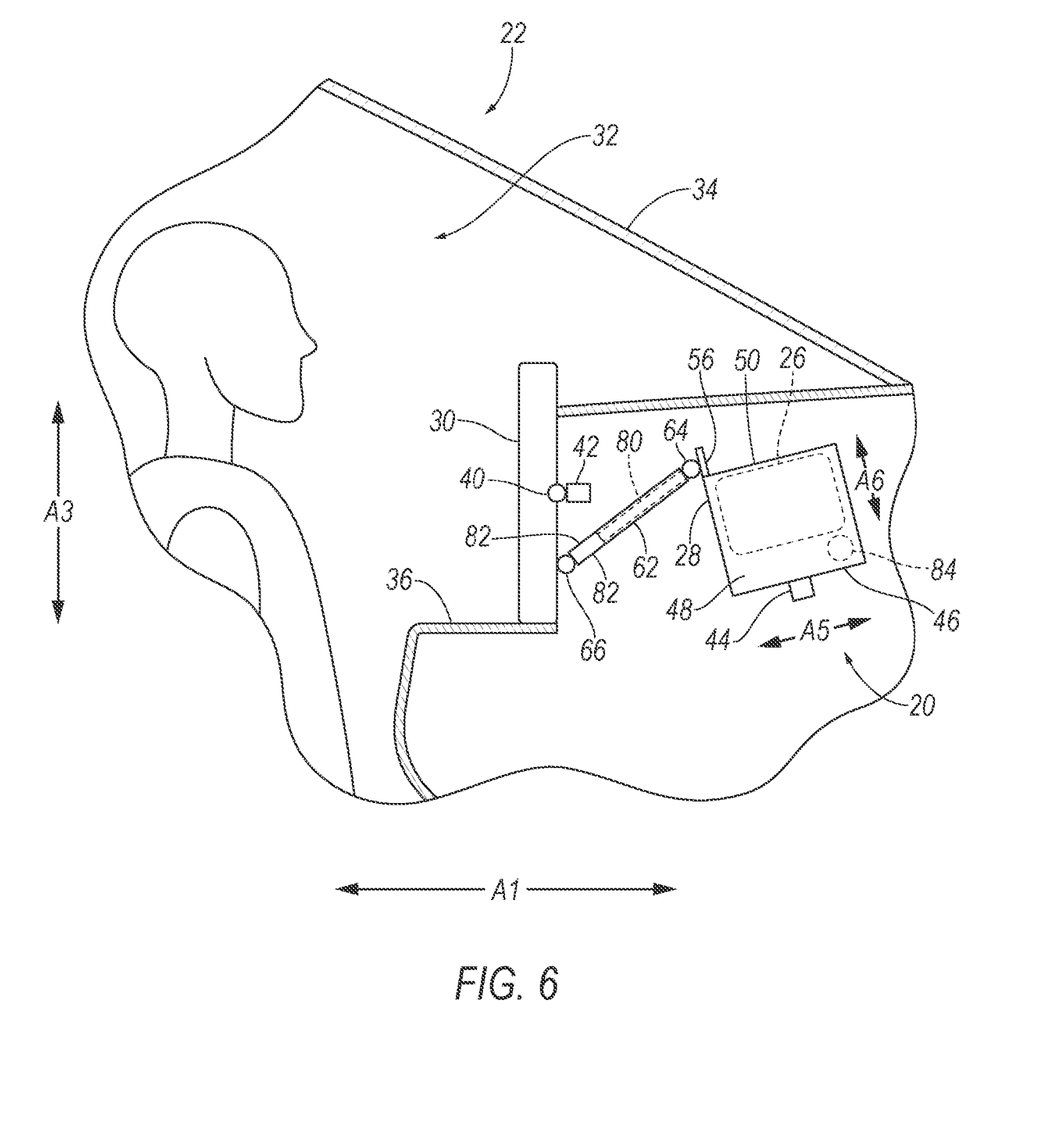
FIG. 6 is a cross section of the instrument panel supporting the airbag housing.
Figure 7:
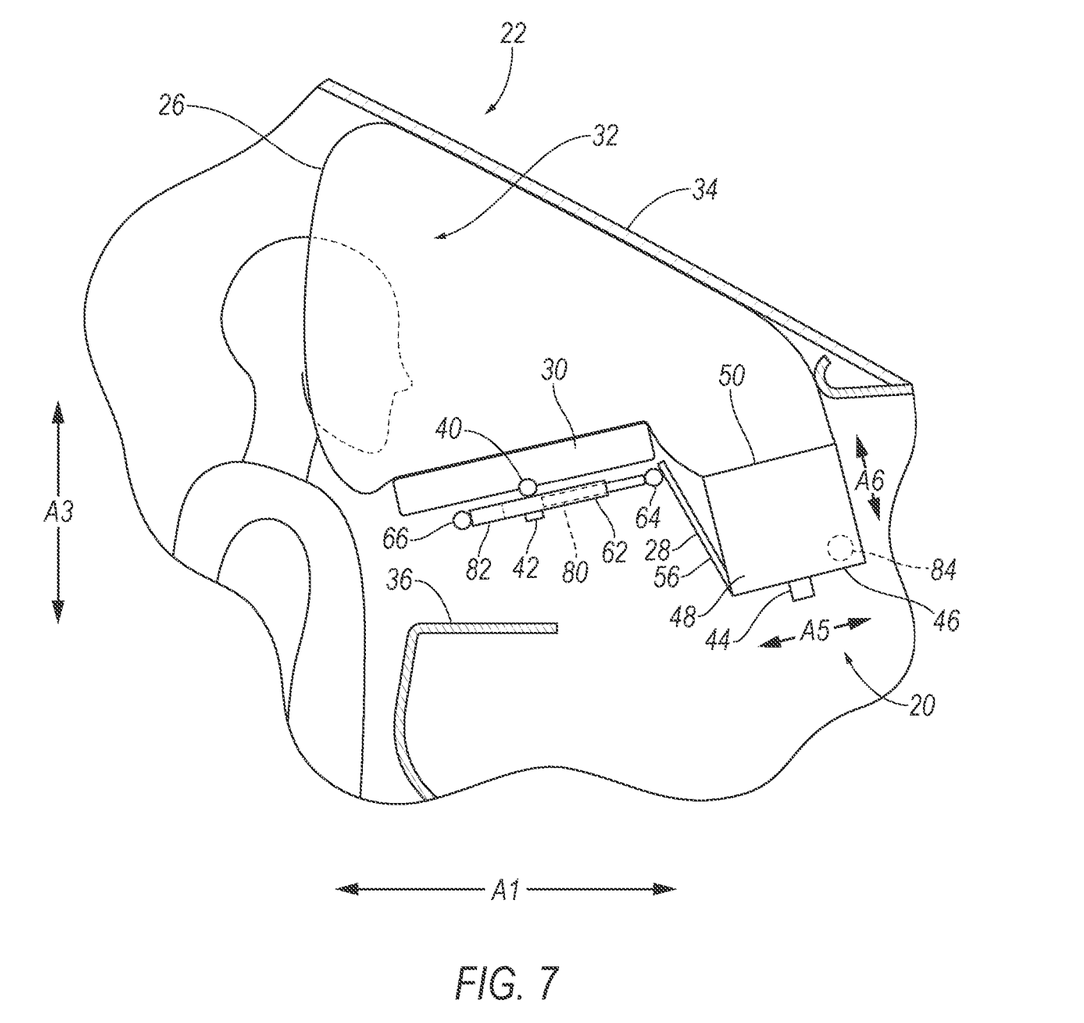
FIG. 7 is a cross section of the instrument panel supporting the airbag housing and having the airbag in the inflated position.

With reference to FIGS. 6 and 7, movement of the press plate 56 to from the initial position to the deployed position may apply force to the first rod 62 and rotate the display screen 30 about the first hinge 40 from the initial position shown in FIG. 6, to the stowed position in shown in FIG. 7. After moving to the deployed position, momentum of the display screen 30 may urge the bottom of the display screen 30 away from the press plate 56, sliding the first portion 80 of the first rod 62 out of engagement with the second portion 82 of the first rod 62.

With reference to FIGS. 8 and 9, movement of the press plate 56 to from the initial position to the deployed position may apply force to the first rod 62 and rotate the second rod 68 about the pivot 72. Rotation of the second rod 68 about the pivot 72 may apply force to the third rod 70, rotating the display screen 30 about the first hinge 40 from the initial position shown in FIG. 8, to the stowed position in shown in FIG. 9. After moving to the deployed position, the press plate 56 may rebound, and urge the first portion 80 of the first rod 62 out of engagement with the second portion 82 of the first rod 62.

With reference to FIGS. 10 and 11, movement of the press plate 56 to from the initial position to the deployed position may apply force to the first rod 62 and rotate the display screen 30 about the first hinge 40 from the initial position shown in FIG. 10, to the stowed position in shown in FIG. 11. After moving to the deployed position, momentum of the display screen 30 may urge the top of the display screen 30 away from the press plate 56, sliding the first portion 80 of the first rod 62 out of engagement with the second portion 82 of the first rod 62.

With reference to FIGS. 12 and 13, movement of the press plate 56 to from the initial position to the deployed position may apply force to the first rod 62 and rotate the display screen 30 about the first hinge 40 from the initial position shown in FIG. 12, to the stowed position in shown in FIG. 13. Movement of the display screen 30 to the stowed position may move a top of the display screen 30 away from the windshield 34, e.g., to reduce interface between a pedestrian and the display screen 30 when the vehicle 22 impacts the pedestrian. After moving to the deployed position, momentum of the display screen 30 may urge the bottom of the display screen 30 away from the press plate 56, sliding the first portion 80 of the first rod 62 out of engagement with the second portion 82 of the first rod 62.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   an airbag inflatable to an inflated position;
   an airbag housing supporting the airbag, the airbag housing having a side wall that is movable outward to a deployed position upon inflation of the airbag;
   a display screen moveable from an initial position to a stowed position, the display screen operatively coupled to the side wall such that movement of the side wall to the deployed position moves the display screen to the stowed position; and
   a rod operatively coupling the side wall to the display screen.

2. The assembly of claim 1, wherein the rod has a first portion and a second portion, the rod is movable from an engaged position to a disengaged position, the first portion is connected to the second position in the engaged position, and the first portion is disconnected from the second portion in the disengaged position.

3. The assembly of claim 1, wherein the rod has a first portion and a second portion, the first portion slidable within the second portion.

4. The assembly of claim 1, further comprising an instrument panel supporting the airbag housing and the display screen.

5. The assembly of claim 4, further comprising a track supported by the instrument panel, the display screen movable along the track from the initial position to the stowed position.

6. The assembly of claim 4, wherein the display screen is supported by the instrument panel at a hinge, the display screen rotatable about the hinge from the initial position to the stowed position.

7. The assembly of claim 6, wherein the rod is supported by the instrument panel at a pivot, the side wall operatively coupled to the rod at one side of the pivot, and the display screen operatively coupled to the rod at an opposite side of the pivot.

8. The assembly of claim 7, further comprising a second rod extending from the rod to the side wall at the one side of the pivot and a third rod extending from the rod to the display screen at the opposite side of the pivot.

9. The assembly of claim 6, wherein the hinge is below the rod.

10. The assembly of claim 6, wherein the hinge is above the rod.

11. The assembly of claim 1, further comprising a windshield, and wherein the display screen is between the airbag housing and the windshield along a longitudinal axis.

12. The assembly of claim 11, wherein the rod extends from the side wall toward the windshield.

13. The assembly of claim 1, wherein the side wall defines a first slot and a second slot, the side wall has a press plate between the first slot and the second slot, and the press plate is movable outward to the deployed position.

14. The assembly of claim 13, wherein the press plate of the side wall is operatively coupled to the display screen such that movement of the press plate to the deployed position moves the display screen to the stowed position.

15. The assembly of claim 13, wherein the airbag housing includes a bottom, wherein the side wall extends from the bottom to a top edge, and wherein the first slot and the second slot extend from the top edge toward the bottom.

16. The assembly of claim 13, wherein the airbag housing includes a hinge, and the press plate pivots about the hinge from the initial position to the deployed position.

17. An assembly, comprising:
   an airbag inflatable to an inflated position;
   an airbag housing supporting the airbag, the airbag housing having a side wall that is movable outward to a deployed position upon inflation of the airbag, the side wall defining a first slot and a second slot, the side wall having a press plate between the first slot and the second slot, and the press plate movable outward to the deployed position; and
   a display screen moveable from an initial position to a stowed position, the display screen operatively coupled to the side wall such that movement of the side wall to the deployed position moves the display screen to the stowed position.

18. The assembly of claim 17, wherein the press plate of the side wall is operatively coupled to the display screen such that movement of the press plate to the deployed position moves the display screen to the stowed position.

19. The assembly of claim 17, wherein the airbag housing includes a bottom, wherein the side wall extends from the bottom to a top edge, and wherein the first slot and the second slot extend from the top edge toward the bottom.

20. The assembly of claim 17, wherein the airbag housing includes a hinge, and the press plate pivots about the hinge from the initial position to the deployed position.

\* \* \* \* \*